(12) United States Patent
Sakamoto et al.

(10) Patent No.: US 12,145,214 B2
(45) Date of Patent: Nov. 19, 2024

(54) LASER MACHINING HEAD AND LASER MACHINING DEVICE

(71) Applicant: HAMAMATSU PHOTONICS K.K., Hamamatsu (JP)

(72) Inventors: Takeshi Sakamoto, Hamamatsu (JP); Junji Okuma, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 781 days.

(21) Appl. No.: 17/288,821

(22) PCT Filed: Oct. 30, 2019

(86) PCT No.: PCT/JP2019/042625
§ 371 (c)(1),
(2) Date: Apr. 26, 2021

(87) PCT Pub. No.: WO2020/090912
PCT Pub. Date: May 7, 2020

(65) Prior Publication Data
US 2021/0394303 A1 Dec. 23, 2021

(30) Foreign Application Priority Data
Oct. 30, 2018 (JP) .................................. 2018-203669

(51) Int. Cl.
*B23K 26/04* (2014.01)
*B23K 26/03* (2006.01)
(Continued)

(52) U.S. Cl.
CPC .......... *B23K 26/048* (2013.01); *B23K 26/032* (2013.01); *B23K 26/064* (2015.10);
(Continued)

(58) Field of Classification Search
CPC .. B23K 26/048; B23K 26/064; B23K 26/032; G01B 11/14; G02B 13/22; G02B 27/108
See application file for complete search history.

(56) References Cited

U.S. PATENT DOCUMENTS

2008/0297761 A1* 12/2008 Franitza ................. G01B 11/14
356/5.01

FOREIGN PATENT DOCUMENTS

CN 101298117 A * 11/2008 ........... G03F 7/2053
CN 101618637 A 1/2010
(Continued)

OTHER PUBLICATIONS

International Preliminary Report on Patentability mailed May 14, 2021 for PCT/JP2019/042625.

*Primary Examiner* — Janie M Loeppke
*Assistant Examiner* — Theodore J Evangelista
(74) *Attorney, Agent, or Firm* — Faegre Drinker Biddle & Reath LLP

(57) ABSTRACT

A laser processing head includes: a housing; an entrance portion; an adjustment portion; and a condensing portion. A distance between a third wall portion and a fourth wall portion facing each other in a second direction is shorter than a distance between a first wall portion and a second wall portion facing each other in a first direction. The housing is configured to be attached to an attachment portion of a laser processing apparatus, with at least one of the first wall portion, the second wall portion, the third wall portion, and a fifth wall portion disposed on the side of the attachment portion. The condensing portion is disposed on a sixth wall portion, and is offset toward the fourth wall portion in the second direction.

21 Claims, 8 Drawing Sheets

(51) Int. Cl.
*B23K 26/064* (2014.01)
*G01B 11/14* (2006.01)
*G02B 13/22* (2006.01)
*G02B 27/10* (2006.01)

(52) U.S. Cl.
CPC .............. *G01B 11/14* (2013.01); *G02B 13/22* (2013.01); *G02B 27/108* (2013.01)

(56) References Cited

FOREIGN PATENT DOCUMENTS

| | | | |
|---|---|---|---|
| CN | 102137731 A | 7/2011 | |
| CN | 102189341 A | 9/2011 | |
| CN | 203738239 U * | 7/2014 | |
| CN | 104162740 A | 11/2014 | |
| CN | 204430566 U | 7/2015 | |
| CN | 108213743 A | 6/2018 | |
| DE | 102015201140 A1 * | 7/2016 | ........... B23K 26/032 |
| JP | H7-214359 A | 8/1995 | |
| JP | 2004-111946 A | 4/2004 | |
| JP | 2005-294656 A | 10/2005 | |
| JP | 2008-066751 A | 3/2008 | |
| JP | 2011-140047 A | 7/2011 | |
| JP | 2011173129 A * | 9/2011 | ........... B23K 26/032 |
| JP | 2013-128088 A | 6/2013 | |
| JP | 2013-536080 A | 9/2013 | |
| JP | 5456510 B2 | 4/2014 | |
| JP | 2014-083562 A | 5/2014 | |
| JP | 2016-000421 A | 1/2016 | |
| JP | 2016-032832 A | 3/2016 | |
| JP | 2017185506 A * | 10/2017 | ............. B23K 26/00 |
| KR | 10-2011-0097625 A | 8/2011 | |
| WO | WO-2012/003033 A1 | 1/2012 | |

* cited by examiner

LASER MACHINING HEAD AND LASER MACHINING DEVICE

TECHNICAL FIELD

The present disclosure relates to a laser processing head and a laser processing apparatus.

BACKGROUND ART

Patent Literature 1 describes a laser processing apparatus including a holding mechanism for holding a workpiece and a laser irradiation mechanism for irradiating the workpiece held by the holding mechanism with a laser light. In the laser processing apparatus described in Patent Literature 1, the laser irradiation mechanism including a condensing lens is fixed to a base, and the holding mechanism moves the workpiece in a direction orthogonal to the optical axis of the condensing lens.

CITATION LIST

Patent Literature

Patent Literature 1: Japanese Patent No. 5456510

SUMMARY OF INVENTION

Technical Problem

In the laser processing apparatus described above, a configuration in which a condensing lens moves in a direction along the optical axis of the condensing lens may be suitable, for the sake of application to various types of processing. However, in the laser processing apparatus described in Patent Literature 1, the laser irradiation mechanism is formed with configurations, on the optical path of the laser light from a laser oscillator to the condensing lens, arranged in the housing, and thus the condensing lens is difficult to move in the direction orthogonal to the optical axis of the condensing lens. The housing may be moved in the direction orthogonal to the optical axis of the condensing lens in one way or another, but this involves a risk of physical interference between the housing and other configurations.

An object of the present disclosure is to provide a laser processing head suitable for moving a condensing portion along a direction orthogonal to its optical axis, and to provide a laser processing apparatus including such a laser processing head.

Solution to Problem

A laser processing head according to one aspect of the present disclosure includes: a housing including a first wall portion and a second wall portion facing each other in a first direction, a third wall portion and a fourth wall portion facing each other in a second direction orthogonal to the first direction, and a fifth wall portion and a sixth wall portion facing each other in a third direction orthogonal to the first direction and the second direction; an entrance portion through which a laser light enters the housing, the entrance portion provided to the housing; an adjustment portion configured to adjust the laser light that has entered through the entrance portion, the adjustment portion disposed in the housing; and a condensing portion configured to condense the laser light that has been adjusted by the adjustment portion, and emit the laser light to outside of the housing, the condensing portion attached to the housing. A distance between the third wall portion and the fourth wall portion is shorter than a distance between the first wall portion and the second wall portion. The housing is configured to be attached to an attachment portion of a laser processing apparatus, with at least one of the first wall portion, the second wall portion, the third wall portion, and the fifth wall portion disposed on side of the attachment portion. The condensing portion is disposed on the sixth wall portion, and is offset toward the fourth wall portion in the second direction.

This laser processing head has no light source, for outputting the laser light, provided in the housing. Thus, the housing can be downsized. In the housing, the distance between the third wall portion and the fourth wall portion is shorter than the distance between the first wall portion and the second wall portion, and the condensing portion disposed on the sixth wall portion is offset toward the fourth wall portion in the second direction. With this configuration, when the housing moves along the second direction in which the third wall portion and the fourth wall portion face each other (the direction orthogonal to the optical axis of the condensing portion), for example, even if another configuration exists on the fourth wall portion side, the condensing portion can be brought near the other configuration. Furthermore, since the distance between the third wall portion and the fourth wall portion is smaller than the distance between the first wall portion and the second wall portion, the space occupied by the housing can be reduced when the housing moves along the second direction, in which the third wall portion and the fourth wall portion face each other. Therefore, the laser processing head is suitable for moving the condensing portion along the direction orthogonal to its optical axis.

In the laser processing head according to one aspect of the present disclosure, the entrance portion may be provided to the fifth wall portion, and may be offset toward the fourth wall portion in the second direction. With this configuration, another configuration can be arranged in a region, of a region in the housing, on the third wall portion side with respect to the adjustment portion, or such a region can be used for the other like purposes. Thus, the region can be effectively used.

The laser processing head according to one aspect of the present disclosure may further include a circuit portion disposed on side of the third wall portion with respect to the adjustment portion in the housing. With this configuration, a region, of a region in the housing, on the third wall portion side with respect to the adjustment portion can be effectively used.

In the laser processing head according to one aspect of the present disclosure, a partitioning wall portion may be provided in the housing to partition a region in the housing into a region on the side of the third wall portion and a region on side of the fourth wall portion, the adjustment portion may be disposed on the side of the fourth wall portion with respect to the partitioning wall portion in the housing, and the circuit portion may be disposed on the side of the third wall portion with respect to the partitioning wall portion in the housing. With this configuration, since the heat generated in the circuit portion is difficult to be transferred to the adjustment portion, it is possible to suppress distortion in the adjustment portion caused by the heat generated in the circuit portion, whereby the laser light can be adjusted appropriately. Furthermore, for example, the circuit portion can be efficiently cooled in the region, of the region in the housing, on the third wall portion side by air cooling, water cooling, or the like.

In the laser processing head according to one aspect of the present disclosure, the adjustment portion may be attached to the partitioning wall portion. With this configuration, the adjustment portion can be reliably and stably supported in the housing.

In the laser processing head according to one aspect of the present disclosure, the circuit portion may be separated from the partitioning wall portion. With this configuration, it is possible to more reliably suppress the heat generated in the circuit portion transferred to the adjustment portion via the partitioning wall portion.

The laser processing head according to one aspect of the present disclosure may further include: a measurement portion configured to output measurement light for measuring a distance between a surface of a target and the condensing portion, and detect the measurement light reflected from the surface of the target via the condensing portion; and a dichroic mirror configured to reflect the measurement light and transmit the laser light. The circuit portion may process a signal output from the measurement portion, and the dichroic mirror may be disposed between the adjustment portion and the condensing portion in the housing. With this configuration, in the laser processing apparatus, processing can be performed based on a result of measuring the distance between the surface of the target and the condensing portion, while effectively using the region in the housing.

In the laser processing head according to one aspect of the present disclosure, the condensing portion may be offset toward one wall portion that is one of the first wall portion and the second wall portion in the first direction. With this configuration, when the housing moves along a direction orthogonal to the optical axis of the condensing portion, even if another configuration exists on the one wall portion side, for example, the condensing portion can be brought near the other configuration.

In the laser processing head according to one aspect of the present disclosure, the entrance portion may be provided to the fifth wall portion, and may be offset toward the one wall portion in the first direction. With this configuration, another configuration can be arranged in a region, of a region in the housing, on the side opposite to the one wall portion with respect to the adjustment portion, or such a region can be used for the other like purposes. Thus, the region can be effectively used.

In the laser processing head according to one aspect of the present disclosure, the measurement portion may be disposed on side opposite to the one wall portion with respect to the adjustment portion in the housing. With this configuration, in the laser processing apparatus, processing can be performed based on a result of measuring the distance between the surface of the target and the condensing portion, while more effectively using the region in the housing.

The laser processing head according to one aspect of the present disclosure may further include a monitoring portion configured to output monitoring light for monitoring the front surface of the target and detect the monitoring light reflected on the surface of the target via the condensing portion. The monitoring portion may be disposed on the side opposite to the one wall portion with respect to the adjustment portion in the housing. With this configuration, in the laser processing apparatus, processing can be performed based on a result of monitoring of the surface of the target, while effectively using the region in the housing.

The laser processing head according to one aspect of the present disclosure may further include a driving portion configured to move the condensing portion along the third direction. The circuit portion may control the driving portion based on the signal output from the measurement portion. With this configuration, the position of the focusing point of the laser light can be adjusted based on a result of measuring the distance between the surface of the target and the condensing portion.

In the laser processing head according to one aspect of the present disclosure, the adjustment portion may include: a mirror configured to reflect the laser light that has entered through the entrance portion; a reflective spatial light modulator configured to modulate the laser light reflected by the mirror; and an imaging optical system serving as a bilateral telecentric optical system in which a reflecting surface of the reflective spatial light modulator and an entrance pupil surface of the condensing portion are in an image relationship, the entrance portion and the mirror may be disposed on a first straight line extending along the third direction, and the reflective spatial light modulator, the imaging optical system, and the condensing portion may be disposed on a second straight line extending along the third direction. With this configuration, the adjustment portion including the reflective spatial light modulator and the imaging optical system can be compactly configured.

In the laser processing head according to one aspect of the present disclosure, the condensing portion may be offset toward one wall portion that is one of the first wall portion and the second wall portion in the first direction, the entrance portion may be offset toward the one wall portion in the first direction, and the first straight line may be positioned on side of the one wall portion with respect to the second straight line. With this configuration, when other optical systems using the condensing portion are configured in the region, of the region in the housing, on the side opposite to the one wall portion side with respect to the adjustment portion, the degree of freedom in configuration of the other optical systems can be improved.

In the laser processing head according to one aspect of the present disclosure, the adjustment portion may further include a beam expander configured to expand a diameter of the laser light, and the beam expander may be disposed between the entrance portion and the mirror on the first straight line. With this configuration, the adjustment portion further including the beam expander can be compactly configured.

In the laser processing head according to one aspect of the present disclosure, the entrance portion, the adjustment portion, and the condensing portion may be disposed on a straight line extending along the third direction. With this configuration, the adjustment portion can be configured compactly.

In the laser processing head according to one aspect of the present disclosure, the adjustment portion may include an attenuator configured to adjust an output of the laser light and a beam expander configured to expand a diameter of the laser light. With this configuration, the adjustment portion including the attenuator and the beam expander can be compactly configured.

A laser processing apparatus according to one aspect of the present disclosure includes: a first laser processing head and a second laser processing head that are each the laser processing head described above; a first attachment portion that is the attachment portion to which the housing of the first laser processing head is attached; a second attachment portion that is the attachment portion to which the housing of the second laser processing head is attached; a light source unit configured to output the laser light entering through each of the entrance portion of the first laser processing head and the entrance portion of the second laser processing head; and a support portion configured to support a target. The first attachment portion and the second attachment portion each move along the second direction. A first housing that is the housing of the first laser processing head is attached to the first attachment portion with the fourth wall portion of the first housing positioned on side of the second laser processing head with respect to the third wall portion of the first housing, and with the sixth wall portion of the first housing positioned on side of the support portion with respect to the fifth wall portion of the first housing. A second housing that is the housing of the second laser processing head is attached to the second attachment portion with the fourth wall portion of the second housing positioned on side of the first laser processing head with respect to the third wall portion of the second housing, and with the sixth wall portion of the second housing positioned on the side of the support portion with respect to the fifth wall portion of the second housing.

In this laser processing apparatus, the condensing portion of the first laser processing head is offset toward the second laser processing head in the first housing, and the condensing portion of the second laser processing head is offset toward the first laser processing head in the second housing. With this configuration, when the first laser processing head and the second laser processing head each move along the second direction (the direction orthogonal to the optical axis of the condensing portion), the condensing portion of the first laser processing head and the condensing portion of the second laser processing head can be brought close to each other. Furthermore, when the first laser processing head and the second laser processing head each moved along the second direction, the space occupied by each of the first laser processing head and the second laser processing head can be reduced. Therefore, with this laser processing apparatus, the target can be efficiently processed.

In the laser processing apparatus according to one aspect of the present disclosure, the first attachment portion and the second attachment portion may each move along the third direction. With this configuration, the target can be processed more efficiently.

In the laser processing apparatus according to one aspect of the present disclosure, the support portion may move along the first direction and rotate about an axis parallel to the third direction. With this configuration, the target can be processed more efficiently.

A laser processing apparatus according to one aspect of the present disclosure includes: the laser processing head described above; the attachment portion to which the housing of the laser processing head is attached; a light source unit configured to output the laser light that enters through the entrance portion of the laser processing head; and a support portion configured to support a target. The attachment portion moves along the second direction.

In the housing of the laser processing head of this laser processing apparatus, the distance between the third wall portion and the fourth wall portion is shorter than the distance between the first wall portion and the second wall portion, and the condensing portion disposed on the sixth wall portion is offset toward the fourth wall portion in the second direction. With this configuration, when the housing moves along the second direction orthogonal to the optical axis of the condensing portion, for example, even if another configuration exists on the fourth wall portion side, the condensing portion can be brought near the other configuration. Furthermore, when the housing moves along the second direction, the space occupied by the housing can be reduced. Therefore, with this laser processing apparatus, the target can be efficiently processed.

In the laser processing apparatus according to one aspect of the present disclosure, the attachment portion may move along the third direction. With this configuration, the target can be processed more efficiently.

In the laser processing apparatus according to one aspect of the present disclosure, the support portion may move along the first direction and rotate about an axis parallel to the third direction. With this configuration, the target can be processed more efficiently.

Advantageous Effects of Invention

According to the present disclosure, it is possible to provide a laser processing head suitable for moving a condensing portion along a direction orthogonal to its optical axis, and to provide a laser processing apparatus including such a laser processing head.

DESCRIPTION OF EMBODIMENTS

Hereinafter, an embodiment of the present disclosure will be described in detail with reference to the drawings. The same elements in the figures will be denoted by the same reference signs, and overlapping descriptions will be omitted.

[Configuration of Laser Processing Apparatus]

Figure 1:
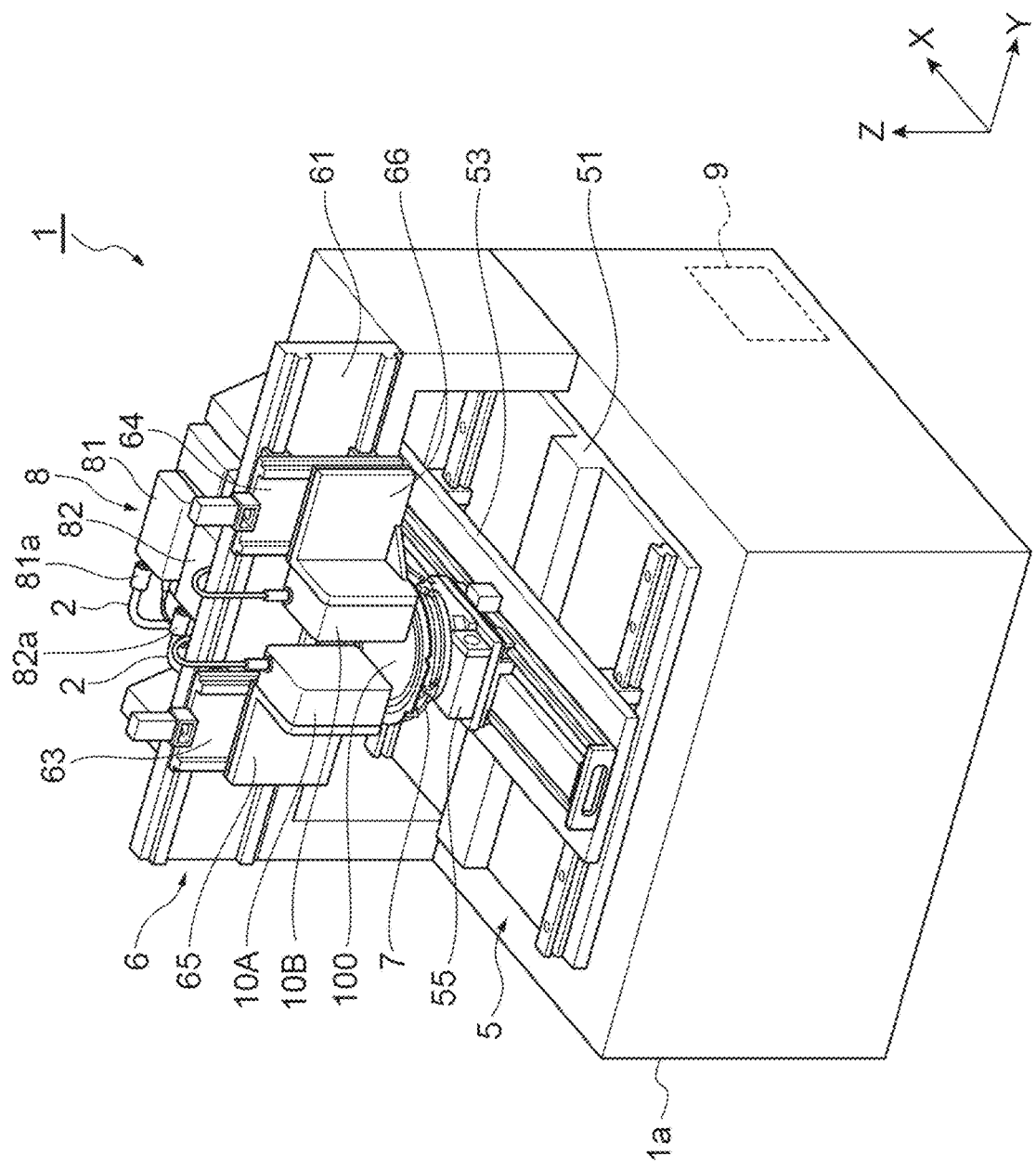
FIG. 1 is a perspective view of a laser processing apparatus of an embodiment.

As illustrated in FIG. 1, a laser processing apparatus 1 includes a plurality of movement mechanisms 5 and 6, a support portion 7, a pair of laser processing heads 10A and 10B (a first laser processing head and a second laser processing head), a light source unit 8, and a controller 9. Hereinafter, a first direction is referred to as an X direction, a second direction orthogonal to the first direction is referred to as a Y direction, and a third direction orthogonal to the first direction and the second direction is referred to as a Z direction. In the present embodiment, the X direction and the Y direction are horizontal directions, and the Z direction is a vertical direction.

The movement mechanism 5 includes a fixed portion 51, a moving portion 53, and an attachment portion 55. The fixed portion 51 is attached to a device frame 1a. The moving portion 53 is attached to a rail provided on the fixed portion 51, and can move along the Y direction. The attachment portion 55 is attached to a rail provided on the moving portion 53, and can move along the X direction.

The movement mechanism 6 includes a fixed portion 61, a pair of moving portions (a first moving portion and a second moving portion) 63 and 64, and a pair of attachment portions (a first attachment portion and a second attachment portion) 65 and 66. The fixed portion 61 is attached to the device frame 1a. The pair of moving portions 63 and 64 are each attached to a rail provided on the fixed portion 61, and can each independently move along the Y direction. The attachment portion 65 is attached to a rail provided on the moving portion 63, and can move along the Z direction. The attachment portion 66 is attached to a rail provided on the moving portion 64, and can move along the Z direction. Thus, the pair of attachment portions 65 and 66 can respectively move along the Y direction and the Z direction relative to the device frame 1a.

The support portion 7 is attached to a rotation shaft provided to the attachment portion 55 of the movement mechanism 5, and can rotate about an axis parallel to the Z direction. Thus, the support portion 7 can move along each of the X direction and the Y direction, and can rotate about the axis parallel to the Z direction. The support portion 7 supports a target 100. The target 100 is, for example, a wafer.

Figure 2:
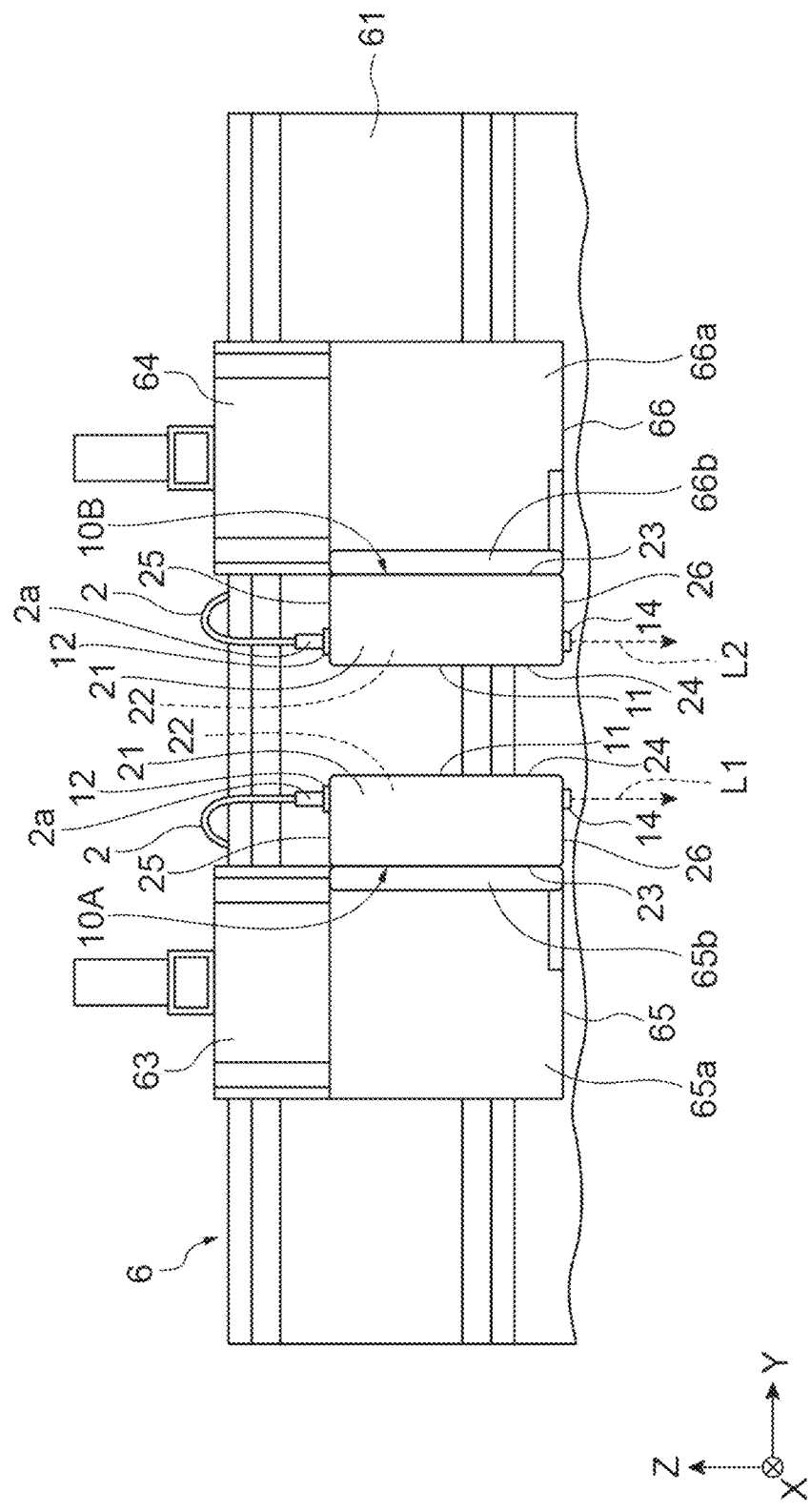
FIG. 2 is a front view of a portion of the laser processing apparatus illustrated in FIG. 1.

As illustrated in FIGS. 1 and 2, the laser processing head 10A is attached to the attachment portion 65 of the movement mechanism 6. The laser processing head 10A irradiates the target 100, supported by the support portion 7, with a laser light (first laser light) L1, while facing the support portion 7 in the Z direction. The laser processing head 10B is attached to the attachment portion 66 of the movement mechanism 6. The laser processing head 10B irradiates the target 100, supported by the support portion 7, with a laser light (second laser light) L2, while facing the support portion 7 in the Z direction.

The light source unit 8 includes a pair of light sources 81 and 82. The pair of light sources 81 and 82 are attached to the device frame 1a. The light source 81 outputs the laser light L1. The laser light L1 is emitted from an emission portion 81a of the light source 81, and is guided to the laser processing head 10A by an optical fiber 2. The light source 82 outputs the laser light L2. The laser light L2 is emitted from an emission portion 82a of the light source 82, and is guided to the laser processing head 10B by another optical fiber 2.

The controller 9 controls each part of the laser processing apparatus 1 (such as the plurality of movement mechanisms 5 and 6, the pair of laser processing heads 10A and 10B, and the light source unit 8). The controller 9 is configured as a computer device including a processor, a memory, a storage, a communication device, and the like. In the controller 9, software (program) loaded onto the memory or the like is performed by the processor, and reading and writing of data from and to the memory and storage, and communication by the communication device are controlled by the processor. Thus, the controller 9 implements various functions.

An example of processing by the laser processing apparatus 1 configured as described above will be described. This example processing is an example in which a modified region is formed inside the target 100 along each of a plurality of lines set to form a grid pattern for cutting the target 100, which is a wafer, into a plurality of chips.

First of all, the movement mechanism 5 moves the support portion 7, supporting the target 100, along each of the X direction and the Y direction to make the support portion 7 face the pair of laser processing heads 10A and 10B in the Z direction. Then, the movement mechanism 5 rotates the support portion 7 about the axis parallel to the Z direction to align the plurality of lines extending in one direction on the target 100 with the X direction.

Subsequently, the movement mechanism 6 moves the laser processing head 10A along the Y direction to position the focusing point of the laser light L1 on one line extending in one direction.

Furthermore, the movement mechanism 6 moves the laser processing head 10B along the Y direction to position the focusing point of the laser light L2 on another one of the lines extending in one direction. Then, the movement mechanism 6 moves the laser processing head 10A along the Z direction to position the focusing point of the laser light L1 inside the target 100. Furthermore, the movement mechanism 6 moves the laser processing head 10B along the Z direction to position the focusing point of the laser light L2 inside the target 100.

Then, the light source 81 outputs the laser light L1 and the laser processing head 10A irradiates the target 100 with the laser light L1, whereas the light source 82 outputs the laser light L2 and the laser processing head 10B irradiates the target 100 with the laser light L2. At the same time, the movement mechanism 5 moves the support portion 7 along the X direction to relatively move the focusing point of the laser light L1 along one line extending in one direction, and to relatively move the focusing point of the laser light L2 along another line extending in one direction. In this manner, the laser processing apparatus 1 forms the modified region inside the target 100 along each of the plurality of lines extending in one direction on the target 100.

Subsequently, the movement mechanism 5 rotates the support portion 7 about an axis parallel to the Z direction so that a plurality of lines extending in the other direction orthogonal to one direction of the target 100 are aligned with the X direction.

Subsequently, the movement mechanism 6 moves the laser processing head 10A along the Y direction to position the focusing point of the laser light L1 on one line extending in the other direction. On the other hand, the movement mechanism 6 moves the laser processing head 10B along the Y direction to position the focusing point of the laser light L2 on another line extending in the other direction. Then, the movement mechanism 6 moves the laser processing head 10A along the Z direction to position the focusing point of the laser light L1 inside the target 100. Furthermore, the movement mechanism 6 moves the laser processing head 10B along the Z direction to position the focusing point of the laser light L2 inside the target 100.

Then, the light source 81 outputs the laser light L1 and the laser processing head 10A irradiates the target 100 with the laser light L1, whereas the light source 82 outputs the laser light L2 and the laser processing head 10B irradiates the target 100 with the laser light L2. At the same time, the movement mechanism 5 moves the support portion 7 along the X direction to relatively move the focusing point of the laser light L1 along one extending in the other direction, and to relatively move the focusing point of the laser light L2 along another line extending in the other direction. In this manner, the laser processing apparatus 1 forms the modified region inside the target 100 along each of the plurality of lines extending in the other direction on the target 100 orthogonal to the one direction.

In one example processing described above, the light source 81 outputs the laser light L1 that transmits through the target 100 by pulse oscillation, and the light source 82 outputs the laser light L2 that transmits through the target 100 by pulse oscillation. When such laser lights are focused inside the target 100, the laser lights are mainly absorbed at the portion corresponding to the focusing points of the laser lights, whereby the modified region is formed inside the target 100. The modified region is a region in which the density, refractive index, mechanical strength, and other physical characteristics are different from those of the surrounding non-modified regions. Examples of the modified region include a melting treatment region, a crack region, a dielectric breakdown region, a refractive index change region, and the like.

When the target 100 is irradiated with the laser light output using the pulse oscillation and the focusing point of the laser light is relatively moved along the line set on the target 100, a plurality of modified spots are formed in an aligned manner along the line. One modified spot is formed by irradiation with one pulse laser light. A line of modified region is a collection of a plurality of modified spots aligned. Adjacent modified spots may be connected to each other or separated from each other depending on the relative moving speed of the focusing point of the laser light with respect to the target 100 and the repetition frequency of the laser light.

[Configuration of Laser Processing Head]

Figure 3:
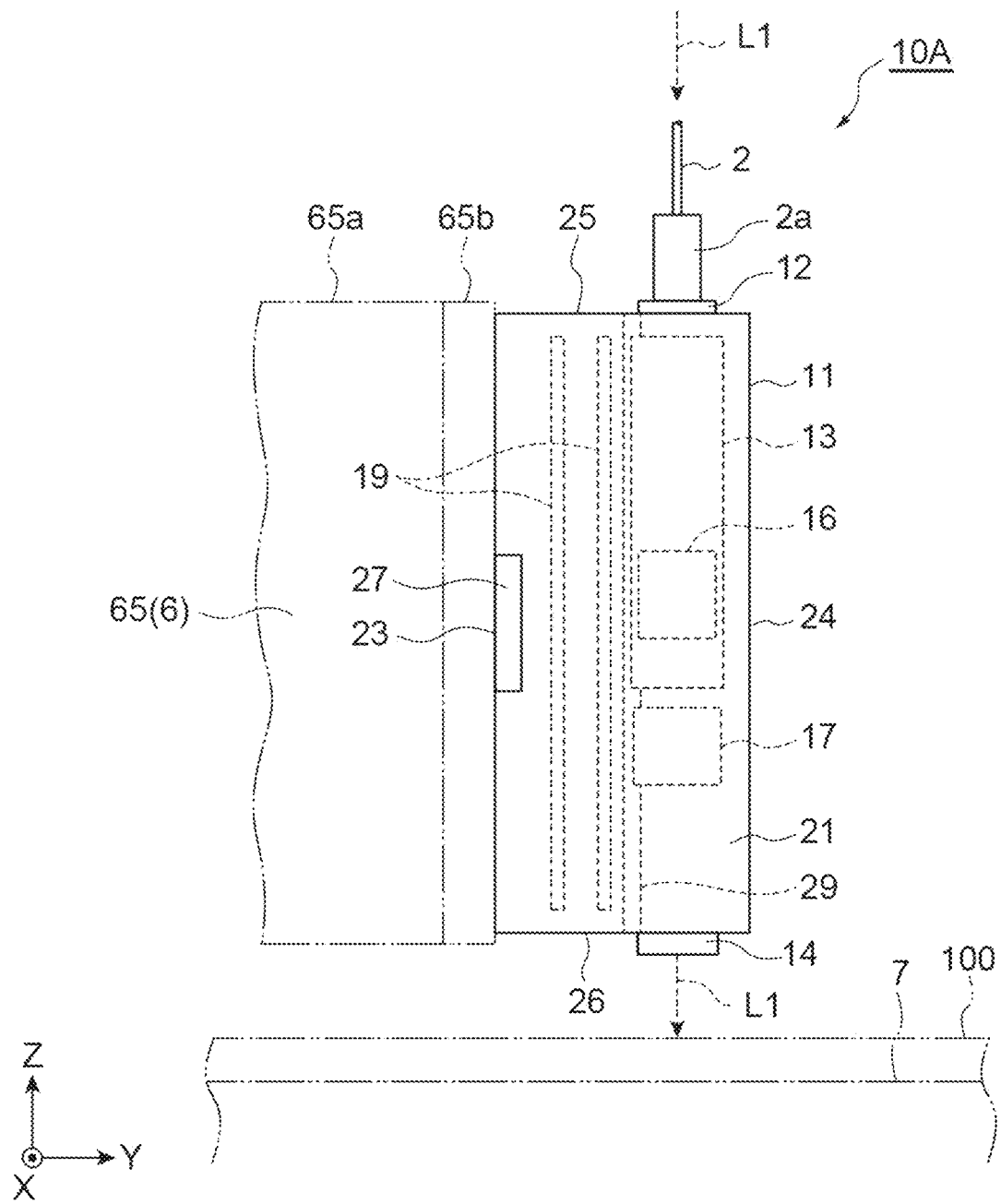
FIG. 3 is a front view of a laser processing head of the laser processing apparatus illustrated in FIG. 1.
Figure 4:
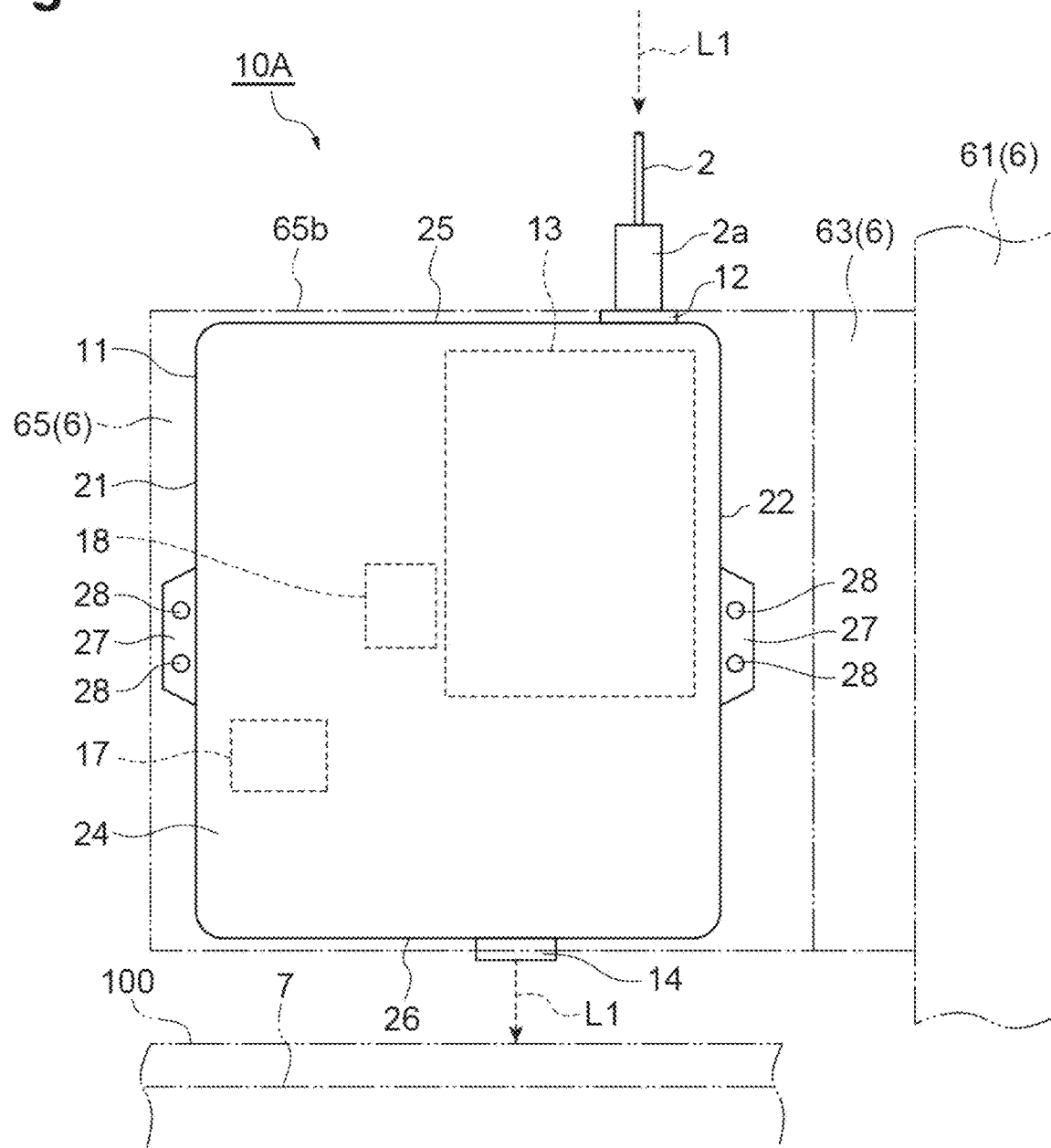
FIG. 4 is a side view of the laser processing head illustrated in FIG. 3.

As illustrated in FIGS. 3 and 4, the laser processing head 10A includes a housing 11, an entrance portion 12, an adjustment portion 13, and a condensing portion 14.

The housing 11 has a first wall portion 21, a second wall portion 22, a third wall portion 23, a fourth wall portion 24, a fifth wall portion 25, and a sixth wall portion 26. The first wall portion 21 and the second wall portion 22 face each other in the X direction. The third wall portion 23 and the fourth wall portion 24 face each other in the Y direction. The fifth wall portion 25 and the sixth wall portion 26 face each other in the Z direction.

The distance between the third wall portion 23 and the fourth wall portion 24 is shorter than the distance between the first wall portion 21 and the second wall portion 22. The distance between the first wall portion 21 and the second wall portion 22 is shorter than the distance between the fifth wall portion 25 and the sixth wall portion 26. The distance between the first wall portion 21 and the second wall portion 22 may the same as the distance between the fifth wall portion 25 and the sixth wall portion 26, or may be longer than the distance between the fifth wall portion 25 and the sixth wall portion 26.

In the laser processing head 10A, the first wall portion 21 is located on the fixed portion 61 side of the movement mechanism 6, and the second wall portion 22 is located on side opposite to the fixed portion 61. The third wall portion 23 is located on the attachment portion 65 side of the movement mechanism 6, and the fourth wall portion 24 is located on the side opposite to the attachment portion 65 which is the laser processing head 10B side (see FIG. 2). The fifth wall portion 25 is located on the side opposite to the support portion 7, and the sixth wall portion 26 is located on the support portion 7 side.

The housing 11 is configured to be attached to the attachment portion 65, with the third wall portion 23 arranged on the attachment portion 65 side of the movement mechanism 6. The specific configuration is as follows. The attachment portion 65 includes a base plate 65a and an attachment plate 65b. The base plate 65a is attached to a rail provided on the moving portion 63 (see FIG. 2). The attachment plate 65b stands at an end portion of the base plate 65a on the laser processing head 10B side (see FIG. 2). The housing 11 is attached to the attachment portion 65 by screwing bolts 28 to the attachment plate 65b via supports 27 in a state where the third wall portion 23 is in contact with the attachment plate 65b. The supports 27 are respectively provided to the first wall portion 21 and the second wall portion 22. The housing 11 is detachably attached to the attachment portion 65.

The entrance portion 12 is attached to the fifth wall portion 25. The laser light L1 enters the housing 11 through the entrance portion 12. The entrance portion 12 is offset toward the second wall portion 22 side (one wall portion side) in the X direction, and is offset toward the fourth wall portion 24 side in the Y direction. Specifically, the distance between the entrance portion 12 and the second wall portion 22 in the X direction is shorter than the distance between the entrance portion 12 and the first wall portion 21 in the X direction, and the distance between the entrance portion 12 and the fourth wall portion 24 in the Y direction is shorter than the distance between the entrance portion 12 and the third wall portion 23 in the X direction.

The entrance portion 12 is configured to be connectable with a connection end portion 2a of the optical fiber 2. The connection end portion 2a of the optical fiber 2 is provided with a collimator lens that collimates the laser light L1 emitted from an emission end of the fiber, but is not provided with an isolator that suppresses the return light. The isolator is provided at an intermediate portion of the fiber more on the light source 81 side than the connection end portion 2a. This leads to downsizing of the connection end portion 2a, and of the entrance portion 12. The isolator may be provided at the connection end portion 2a of the optical fiber 2.

The adjustment portion 13 is arranged in the housing 11. The adjustment portion 13 adjusts the laser light L1 entered through the entrance portion 12. The adjustment portion 13 is disposed on the fourth wall portion 24 side with respect to a partitioning wall portion 29 in the housing 11. The adjustment portion 13 is attached to the partitioning wall portion 29. The partitioning wall portion 29 is provided in the housing 11 and partitions the region in the housing 11 into a region on the third wall portion 23 side and a region on the fourth wall portion 24 side. The partitioning wall portion 29 is integrated with the housing 11. Each configuration of the adjustment portion 13 is attached to the partitioning wall portion 29 on the fourth wall portion 24 side. The partitioning wall portion 29 functions as an optical base that supports each configuration of the adjustment portion 13. Details of the configurations of the adjustment portion 13 will be described later.

The condensing portion 14 is arranged in the sixth wall portion 26. Specifically, the condensing portion 14 is arranged in the sixth wall portion 26 while being inserted into a hole 26a formed in the sixth wall portion 26. The condensing portion 14 condenses the laser light L1 adjusted by the adjustment portion 13 and emits it to the outside of the housing 11. The condensing portion 14 is offset toward the second wall portion 22 (one wall portion side) in the X direction, and is offset toward the fourth wall portion 24 in the Y direction. Specifically, the distance between the condensing portion 14 and the second wall portion 22 in the X direction is shorter than the distance between the condensing portion 14 and the first wall portion 21 in the X direction, and the distance between the condensing portion 14 and the fourth wall portion 24 in the Y direction is shorter than the distance between the condensing portion 14 and the third wall portion 23 in the X direction.

Figure 5:
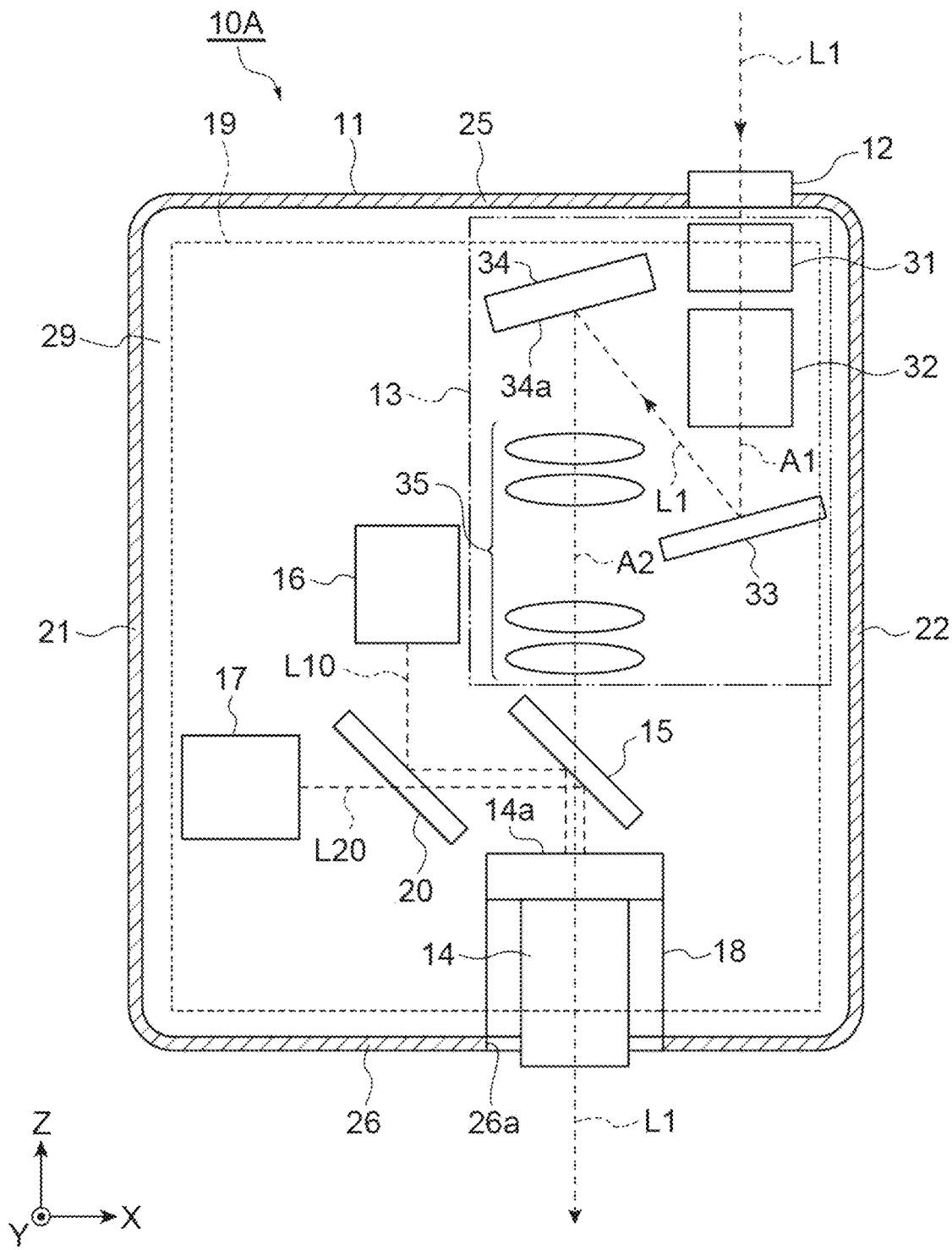
FIG. 5 is a diagram illustrating a configuration of an optical system of the laser processing head illustrated in FIG. 3.

As illustrated in FIG. 5, the adjustment portion 13 includes an attenuator 31, a beam expander 32, and a mirror 33. The entrance portion 12, as well as the attenuator 31, the beam expander 32, and the mirror 33 of the adjustment portion 13 are arranged on a straight line (first straight line) A1 extending along the Z direction. The attenuator 31 and the beam expander 32 are arranged between the entrance portion 12 and the mirror 33 on the straight line A1. The attenuator 31 adjusts the output of the laser light L1 that has entered through the entrance portion 12. The beam expander 32 expands the diameter of the laser light L1 the output of which has been adjusted by the attenuator 31. The mirror 33 reflects the laser light L1 the diameter of which has been expanded by the beam expander 32.

The adjustment portion 13 further includes a reflective spatial light modulator 34 and an imaging optical system 35. The reflective spatial light modulator 34 and the imaging optical system 35 of the adjustment portion 13 as well as the condensing portion 14 are arranged on a straight line (second straight line) A2 extending along the Z direction. The reflective spatial light modulator 34 modulates the laser light L1 reflected by the mirror 33. The reflective spatial light modulator 34 is, for example, a spatial light modulator (SLM) of a reflective liquid crystal (Liquid Crystal on Silicon (LCOS)). The imaging optical system 35 serves as a bilateral telecentric optical system in which a reflecting surface 34a of the reflective spatial light modulator 34 and an entrance pupil surface 14a of the condensing portion 14 are in an imaging relationship. The imaging optical system 35 includes three or more lenses.

The straight line A1 and the straight line A2 are located on a plane orthogonal to the Y direction. The straight line A1 is located on the second wall portion 22 side (one wall portion side) with respect to the straight line A2. In the laser processing head 10A, the laser light L1 enters the housing 11 through the entrance portion 12, travels on the straight line A1, is sequentially reflected by the mirror 33 and the reflective spatial light modulator 34, and then travels on the straight line A2 to be emitted to the outside of the housing 11 through the condensing portion 14. The order of arrangement of the attenuator 31 and the beam expander 32 may be reversed. The attenuator 31 may be arranged between the mirror 33 and the reflective spatial light modulator 34. The adjustment portion 13 may further include other optical components (for example, a steering mirror arranged in front of the beam expander 32 or the like).

The laser processing head 10A further includes a dichroic mirror 15, a measurement portion 16, a monitoring portion 17, a driving portion 18, and a circuit portion 19.

The dichroic mirror 15 is arranged between the imaging optical system 35 and the condensing portion 14 on the straight line A2. That is, the dichroic mirror 15 is arranged between the adjustment portion 13 and the condensing portion 14 in the housing 11. The dichroic mirror 15 is attached to the partitioning wall portion 29 on the fourth wall portion 24 side. The dichroic mirror 15 transmits the laser light L1. From the sake of suppressing astigmatism, the dichroic mirror 15 is preferably of, for example, a cube type or a two-plate type arranged in a twisted relationship.

The measurement portion 16 is arranged in the housing 11 on the first wall portion 21 side (opposite to one wall portion side) with respect to the adjustment portion 13. The measurement portion 16 is attached to the partitioning wall portion 29 on the fourth wall portion 24 side. The measurement portion 16 outputs measurement light L10 for measuring the distance between the surface of the target 100 (for example, the surface on the side where the laser light L1 is incident) and the condensing portion 14, and detects the measurement light L10 reflected by the surface of the target 100 via the condensing portion 14. Thus, the surface of the target 100 is irradiated with the measurement light L10 output from the measurement portion 16, via the condensing portion 14, and then, the measurement light L10 reflected by the surface of the target 100 is detected by the measurement portion 16 via the condensing portion 14.

More specifically, the measurement light L10 output from the measurement portion 16 is sequentially reflected by a beam splitter 20 and the dichroic mirror 15 attached to the partitioning wall portion 29 on the fourth wall portion 24 side, and then is emitted to the outside of the housing 11 from the condensing portion 14. The measurement light L10 reflected on the surface of the target 100 enters the housing 11 from the condensing portion 14 and is sequentially reflected by the dichroic mirror 15 and the beam splitter 20, to be incident on and detected by the measurement portion 16.

The monitoring portion 17 is arranged in the housing 11 on the first wall portion 21 side (opposite to one wall portion side) with respect to the adjustment portion 13. The monitoring portion 17 is attached to the partitioning wall portion 29 on the fourth wall portion 24 side. The monitoring portion 17 outputs monitoring light L20 for monitoring the surface of the target 100 (for example, the surface on the side where the laser light L1 is incident), and detects the monitoring light L20 reflected by the surface of the target 100, via the condensing portion 14. Thus, the surface of the target 100 is irradiated with the monitoring light L20 output from the monitoring portion 17, via the condensing portion 14, and then, the monitoring light L20 reflected by the surface of the target 100 is detected by the monitoring portion 17 via the condensing portion 14.

More specifically, the monitoring light L20 output from the monitoring portion 17 transmits through the beam splitter 20 and is reflected by the dichroic mirror 15, to be emitted to the outside of the housing 11 from the condensing portion 14. The monitoring light L20 reflected by the surface of the target 100 enters the housing 11 through the condensing portion 14, and is reflected by the dichroic mirror 15 to be transmitted through the beam splitter 20 and to be incident on and detected by the monitoring portion 17. Wavelengths of the laser light L1, the measurement light L10, and the monitoring light L20 are different from each other (at least their center wavelengths are shifted from each other).

The driving portion 18 is attached to the partitioning wall portion 29 on the fourth wall portion 24 side. The driving portion 18 moves the condensing portion 14, arranged on the sixth wall portion 26, along the Z direction using, for example, driving force of a piezoelectric element.

The circuit portion 19 is arranged on the third wall portion 23 side with respect to the partitioning wall portion 29, in the housing 11. Specifically, in the housing 11, the circuit portion 19 is arranged on the third wall portion 23 side with respect to the adjustment portion 13, the measurement portion 16, and the monitoring portion 17. The circuit portion 19 is separated from the partitioning wall portion 29. The circuit portion 19 is, for example, a plurality of circuit boards. The circuit portion 19 processes a signal output from the measurement portion 16 and a signal input to the reflective spatial light modulator 34. The circuit portion 19 controls the driving portion 18 based on the signal output from the measurement portion 16. As an example, the circuit portion 19 controls the driving portion 18 to maintain a constant distance between the surface of the target 100 and the condensing portion 14 (to maintain a constant distance between the surface of the target 100 and the focusing point of the laser light L1) based on the signal output from the measurement portion 16. The housing 11 is provided with a connector (not illustrated) to which wiring for electrically connecting the circuit portion 19 to the controller 9 (see FIG. 1) or the like is connected.

Similar to the laser processing head 10A, the laser processing head 10B includes the housing 11, the entrance portion 12, the adjustment portion 13, the condensing portion 14, the dichroic mirror 15, the measurement portion 16, the monitoring portion 17, the driving portion 18, and the circuit portion 19. Note that, as illustrated in FIG. 2, the configurations of the laser processing head 10B are in a plane-symmetrical relationship with the configurations of the laser processing head 10A, about a virtual plane that passes through the midpoint between the pair of attachment portions 65 and 66 and is orthogonal to the Y direction.

For example, the housing (first housing) 11 of the laser processing head 10A is attached to the attachment portion 65 with the fourth wall portion 24 positioned on the laser processing head 10B side with respect to the third wall portion 23, and with the sixth wall portion 26 positioned on the support portion 7 side with respect to the fifth wall portion 25. On the other hand, the housing (second housing) 11 of the laser processing head 10B is attached to the attachment portion 66 with the fourth wall portion 24 positioned on the laser processing head 10A side with respect to the third wall portion 23, and with the sixth wall portion 26 positioned on the support portion 7 side with respect to the fifth wall portion 25.

The housing 11 of the laser processing head 10B is configured to be attached to the attachment portion 66 with the third wall portion 23 arranged on the attachment portion 66 side. The specific configuration is as follows. The attachment portion 66 includes a base plate 66a and an attachment plate 66b. The base plate 66a is attached to a rail provided on the moving portion 63. The attachment plate 66b stands at an end portion of the base plate 66a on the laser processing head 10A side. The housing 11 of the laser processing head 10B is attached to the attachment portion 66 with the third wall portion 23 being in contact with the attachment plate 66b. The housing 11 of the laser processing head 10B is detachably attached to the attachment portion 66.

[Operation and Effect]

The laser processing head 10A has no light source, for outputting the laser light L1, provided in the housing 11. Thus, the housing 11 can be downsized. In the housing 11, the distance between the third wall portion 23 and the fourth wall portion 24 is shorter than the distance between the first wall portion 21 and the second wall portion 22, and the condensing portion 14 arranged on the sixth wall portion 26 is offset toward the fourth wall portion 24 in the Y direction. With this configuration, when the housing 11 moves along the Y direction in which the third wall portion 23 and the fourth wall portion 24 face each other, even if another configuration (the laser processing head 10B, for example) exists on the fourth wall portion 24 side, the condensing portion 14 can be brought near the other configuration. Furthermore, since the distance between the third wall portion 23 and the fourth wall portion 24 is smaller than the distance between the first wall portion 21 and the second wall portion 22, the space occupied by the housing 11 can be reduced when the housing 11 moves along the Y direction, in which the third wall portion 23 and the fourth wall portion 24 face each other. Therefore, the laser processing head 10A is suitable for moving the condensing portion 14 along the direction orthogonal to its optical axis.

In the laser processing head 10A, the entrance portion 12 is provided in the fifth wall portion 25 and is offset toward the fourth wall portion 24 in the Y direction. With this configuration, another configuration (the circuit portion 19 for example) can be arranged in a region, of a region in the housing 11, on the third wall portion 23 side with respect to the adjustment portion 13, or such a region can be used for the other like purposes. Thus, the region can be effectively used.

The laser processing head 10A has the circuit portion 19 arranged on the third wall portion 23 side with respect to the adjustment portion 13 in the housing 11. With this configuration, a region, of a region in the housing 11, on the third wall portion 23 side with respect to the adjustment portion 13 can be effectively used.

The laser processing head 10A has the adjustment portion 13 arranged on the fourth wall portion 24 with respect to the partitioning wall portion 29 in the housing 11, and has the circuit portion 19 arranged on the third wall portion 23 side with respect to the partitioning wall portion 29 in the housing 11. With this configuration, since the heat generated in the circuit portion 19 is difficult to be transferred to the adjustment portion 13, it is possible to suppress distortion in the adjustment portion 13 caused by the heat generated in the circuit portion 19, whereby the laser light L1 can be adjusted appropriately. Furthermore, for example, the circuit portion 19 can be efficiently cooled in the region, of the region in the housing 11, on the third wall portion 23 side by air cooling, water cooling, or the like.

The laser processing head 10A has the adjustment portion 13 attached to the partitioning wall portion 29. With this configuration, the adjustment portion 13 can be reliably and stably supported in the housing 11.

In the laser processing head 10A, the circuit portion 19 is separated from the partitioning wall portion 29. With this configuration, it is possible to more reliably suppress the heat generated in the circuit portion 19 transferred to the adjustment portion 13 via the partitioning wall portion 29.

In the laser processing head 10A, the condensing portion 14 is offset toward the second wall portion 22 in the X direction. With this configuration, when the housing 11 moves along a direction orthogonal to the optical axis of the condensing portion 14, for example, even if another configuration exists on the second wall portion 22 side, the condensing portion 14 can be brought near the other configuration.

In the laser processing head 10A, the entrance portion 12 is provided in the fifth wall portion 25 and is offset toward the second wall portion 22 in the X direction. With this configuration, another configuration (the measurement portion 16 and the monitoring portion 17 for example) can be arranged in a region, of a region in the housing 11, on the first wall portion 21 side with respect to the adjustment portion 13, or such a region can be used for the other like purposes. Thus, the region can be effectively used.

In the laser processing head 10A, the measurement portion 16 and the monitoring portion 17 are arranged in the region, of the region in the housing 11, on the first wall portion 21 side with respect to the adjustment portion 13. The circuit portion 19 is arranged in the region in the housing 11, on the third wall portion 23 side with respect to the adjustment portion 13. The dichroic mirror 15 is arranged between the adjustment portion 13 and the condensing portion 14 in the housing 11. With this configuration, the region inside the housing 11 can be effectively used. Furthermore, in the laser processing apparatus 1, processing can be performed based on a result of measuring the distance between the surface of the target 100 and the condensing portion 14. Furthermore, in the laser processing apparatus 1, processing can be performed based on a result of monitoring the surface of the target 100.

In the laser processing head 10A, the circuit portion 19 controls the driving portion 18 based on the signal output from the measurement portion 16. With this configuration, the position of the focusing point of the laser light L1 can be adjusted based on a result of measuring the distance between the surface of the target 100 and the condensing portion 14.

Furthermore, in the laser processing head 10A, the entrance portion 12 as well as the attenuator 31, the beam expander 32, and the mirror 33 of the adjustment portion 13 are arranged on the straight line A1 extending along the Z direction. Furthermore, the reflective spatial light modulator 34, the imaging optical system 35, and the condensing portion 14 of the adjustment portion 13 as well as the condensing portion 14 are arranged on the straight line A2 extending along the Z direction. With this configuration, the adjustment portion 13 including the attenuator 31, the beam expander 32, the reflective spatial light modulator 34, and the imaging optical system 35 can be compactly configured.

In the laser processing head 10A, the straight line A1 is positioned on the second wall portion 22 side with respect to the straight line A2. With this configuration, when other optical systems using the condensing portion 14 (the measurement portion 16 and the monitoring portion 17 for example) are configured in the region, of the region in the housing 11, on the first wall portion 21 side with respect to the adjustment portion 13, the degree of freedom in configuration of the other optical systems can be improved.

The above actions and effects are similarly provided by the laser processing head 10B.

In the laser processing apparatus 1, the condensing portion 14 of the laser processing head 10A is offset toward the laser processing head 10B in the housing 11 of the laser processing head 10A, and the condensing portion 14 of the laser processing head 10B is offset toward the laser processing head 10A in the housing 11 of the laser processing head 10B. With this configuration, when the pair of laser processing heads 10A and 10B move along the Y direction, the condensing portion 14 of the laser processing head 10A and the condensing portion 14 of the laser processing head 10B can be brought close to each other. Furthermore, when the pair of laser processing heads 10A and 10B each move along the Y direction, the space occupied by each of the pair of laser processing heads 10A and 10B can be reduced. Therefore, with the laser processing apparatus 1, the target 100 can be efficiently processed.

In the laser processing apparatus 1, the pair of attachment portions 65 and 66 respectively move along the Y direction and the Z direction. With this configuration, the target 100 can be processed more efficiently.

In the laser processing apparatus 1, the support portion 7 moves along each of the X direction and the Y direction, and rotates about the axis parallel to the Z direction. With this configuration, the target 100 can be processed more efficiently.

Modification Examples

Figure 6:
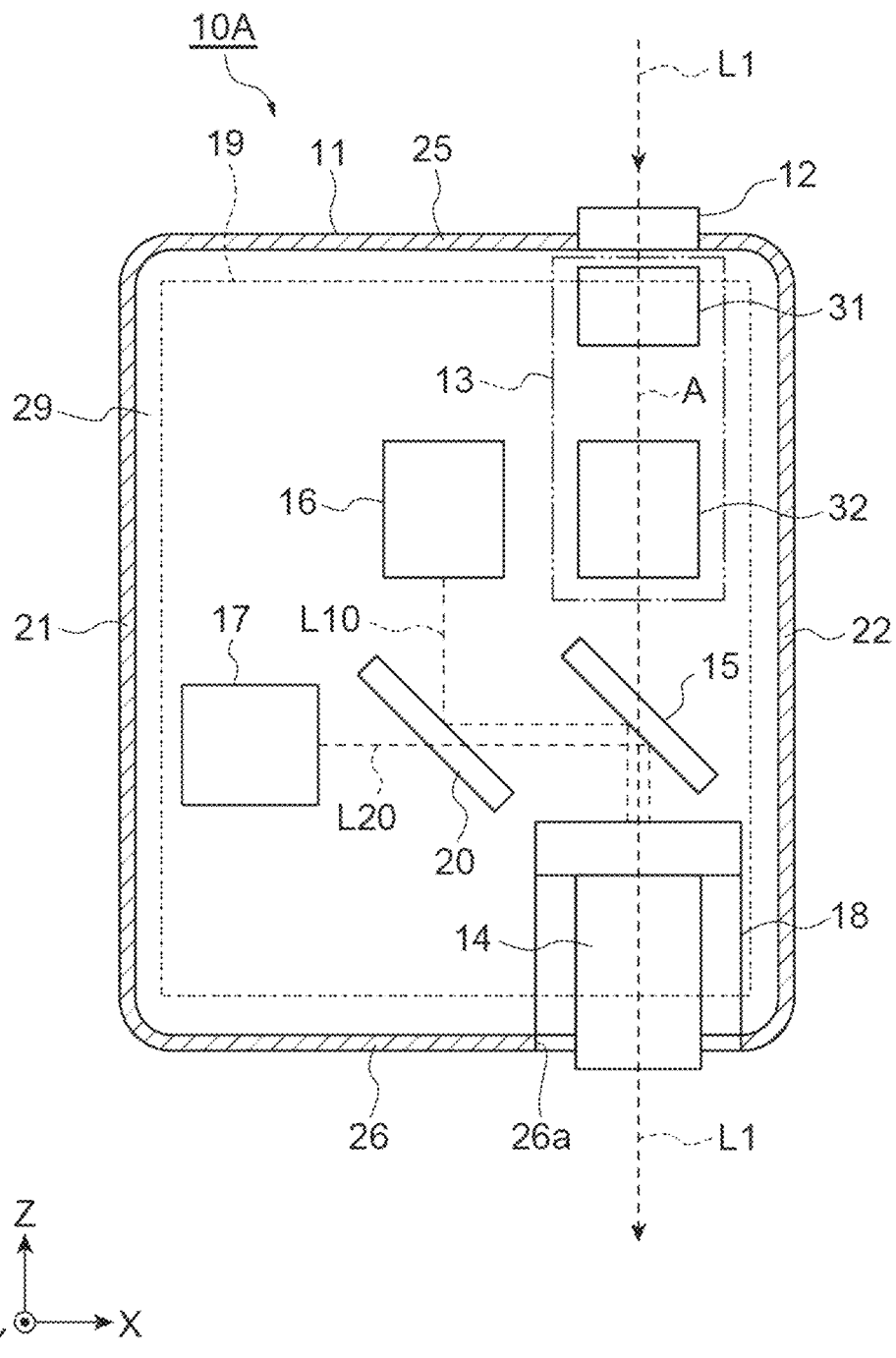
FIG. 6 is a diagram illustrating a configuration of an optical system of a laser processing head of a modification example.

The present disclosure is not limited to the embodiment described above. For example, as illustrated in FIG. 6, the entrance portion 12, the adjustment portion 13, and the condensing portion 14 may be arranged on a straight line A extending along the Z direction. With this configuration, the adjustment portion 13 can be configured compactly. In this case, the adjustment portion 13 may not include the reflective spatial light modulator 34 and the imaging optical system 35. Further, the adjustment portion 13 may include the attenuator 31 and the beam expander 32. With this configuration, the adjustment portion 13 including the attenuator 31 and the beam expander 32 can be compactly configured. The order of arrangement of the attenuator 31 and the beam expander 32 may be reversed.

The housing 11 may have any configuration to be attached to the attachment portion 65 (or the attachment portion 66) with at least one of the first wall portion 21, the second wall portion 22, the third wall portion 23, and the fifth wall portion 25 arranged on the attachment portion 65 (or the attachment portion 66) side of the laser processing apparatus 1. The condensing portion 14 may have any configuration as long as it is at least offset toward the fourth wall portion 24 in the Y direction. With such configurations, when the housing 11 moves along the Y direction, for example, even if another configuration exists on the fourth wall portion 24 side, the condensing portion 14 can be brought near the other configuration. Furthermore, when the housing 11 moves along the Y direction, the space occupied by the housing 11 can be reduced. When the housing 11 moves along the Z direction, the condensing portion 14 can be brought close to the target 100, for example.

The condensing portion 14 may be offset toward the first wall portion 21 in the X direction. With this configuration, when the housing 11 moves along a direction orthogonal to the optical axis of the condensing portion 14, even if another configuration exists on the first wall portion 21 side, for example, the condensing portion 14 can be brought near the other configuration. In this case, the entrance portion 12 may be offset toward the first wall portion 21 in the X direction. With this configuration, another configuration (the measurement portion 16 and the monitoring portion 17 for example) can be arranged in a region, of a region in the housing 11, on the second wall portion 22 side with respect to the adjustment portion 13, or such a region can be used for the other like purposes. Thus, the region can be effectively used.

The circuit portion 19 is not limited to the configuration of processing a signal output from the measurement portion 16 and/or a signal input to the reflective spatial light modulator 34, and may process any signal in the laser processing head.

Figure 7:
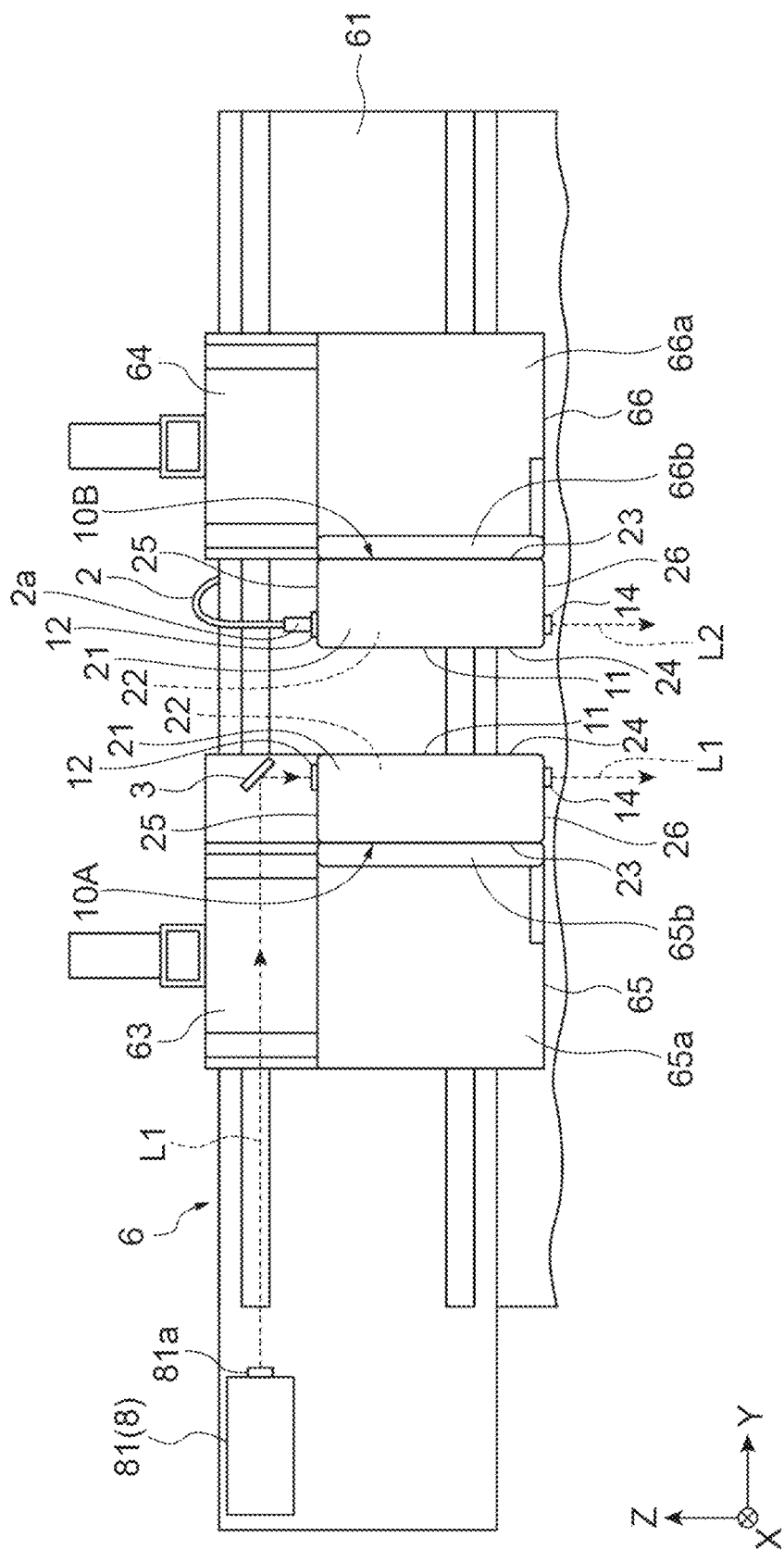
FIG. 7 is a front view of a portion of the laser processing apparatus of the modification example.

Further, at least one of the guiding of the laser light L1 from the emission portion 81a of the light source unit 8 to the entrance portion 12 of the laser processing head 10A and guiding of the laser light L2 from the emission portion 82a of the light source unit 8 to the entrance portion 12 of the laser processing head 10B may be implemented by a mirror. FIG. 7 is a front view of a portion of the laser processing apparatus 1 in which the laser light L1 is guided by a mirror. In the configuration illustrated in FIG. 7, the light source 81 is attached to the fixed portion 61 to be position on the side (side opposite to the moving portion 64) of the moving portion 63 in the Y direction. The emission portion 81a of the light source 81 faces toward the moving portion 63 side. The mirror 3 that reflects the laser light L1 is attached to the moving portion 63. The mirror 3 is attached to the moving portion 63 to face the emission portion 81a of the light source 81 in the Y direction and to face the entrance portion 12 of the laser processing head 10A in the Z direction. The laser light L1 emitted from the emission portion 81a of the light source 81 is reflected by the mirror 3 to enter through the entrance portion 12 of the laser processing head 10A. The light source 81 may be attached to the device frame 1a.

With the configuration illustrated in FIG. 7, the state where the mirror 3 faces the emission portion 81a of the light source 81 in the Y direction is maintained, even when the moving portion 63 moves along the Y direction. Furthermore, the state where the mirror 3 faces the entrance portion 12 of the laser processing head 10A in the Z direction is maintained, even when the attachment portion 65 moves along the Z direction. Thus, the laser light L1 emitted from the emission portion 81a of the light source 81 can reliably enter the entrance portion 12 of the laser processing head 10A, regardless of the position of the laser processing head 10A. Furthermore, a light source such as a high output ultrashort pulse laser, guiding for which using the optical fiber 2 is otherwise difficult, can be used.

Furthermore, with the configuration illustrated in FIG. 7, the mirror 3 may be attached to the moving portion 63 to have at least one of angle and position adjustable. With this configuration, the laser light L1 emitted from the emission portion 81a of the light source 81 can reliably enter the entrance portion 12 of the laser processing head 10A.

Furthermore, the light source unit 8 may include a single light source. In this case, the light source unit 8 may be configured to emit a part of a laser light, output from one light source, from the emission portion 81a and emit the remaining part of the laser light from an emission portion 82a.

Furthermore, the laser processing apparatus 1 may include one laser processing head 10A. Also in the laser processing apparatus 1 including one laser processing head 10A, when the housing 11 moves along the Y direction orthogonal to the optical axis of the condensing portion 14, even if another configuration exists on the fourth wall portion 24 side, for example, the condensing portion 14 can be brought near the other configuration. Furthermore, when the housing 11 moves along the Y direction, the space occupied by the housing 11 can be reduced. Thus, also with the laser processing apparatus 1 including one laser processing head 10A, the target 100 can be efficiently processed. Furthermore, in the laser processing apparatus 1 including one laser processing head 10A, when the attachment portion 65 moves along the Z direction, the target 100 can be processed more efficiently. Furthermore, in the laser processing apparatus 1 provided with one laser processing head 10A, when the support portion 7 moves along the X direction and rotates about the axis parallel to the Z direction, the target 100 can be processed more efficiently.

Figure 8:
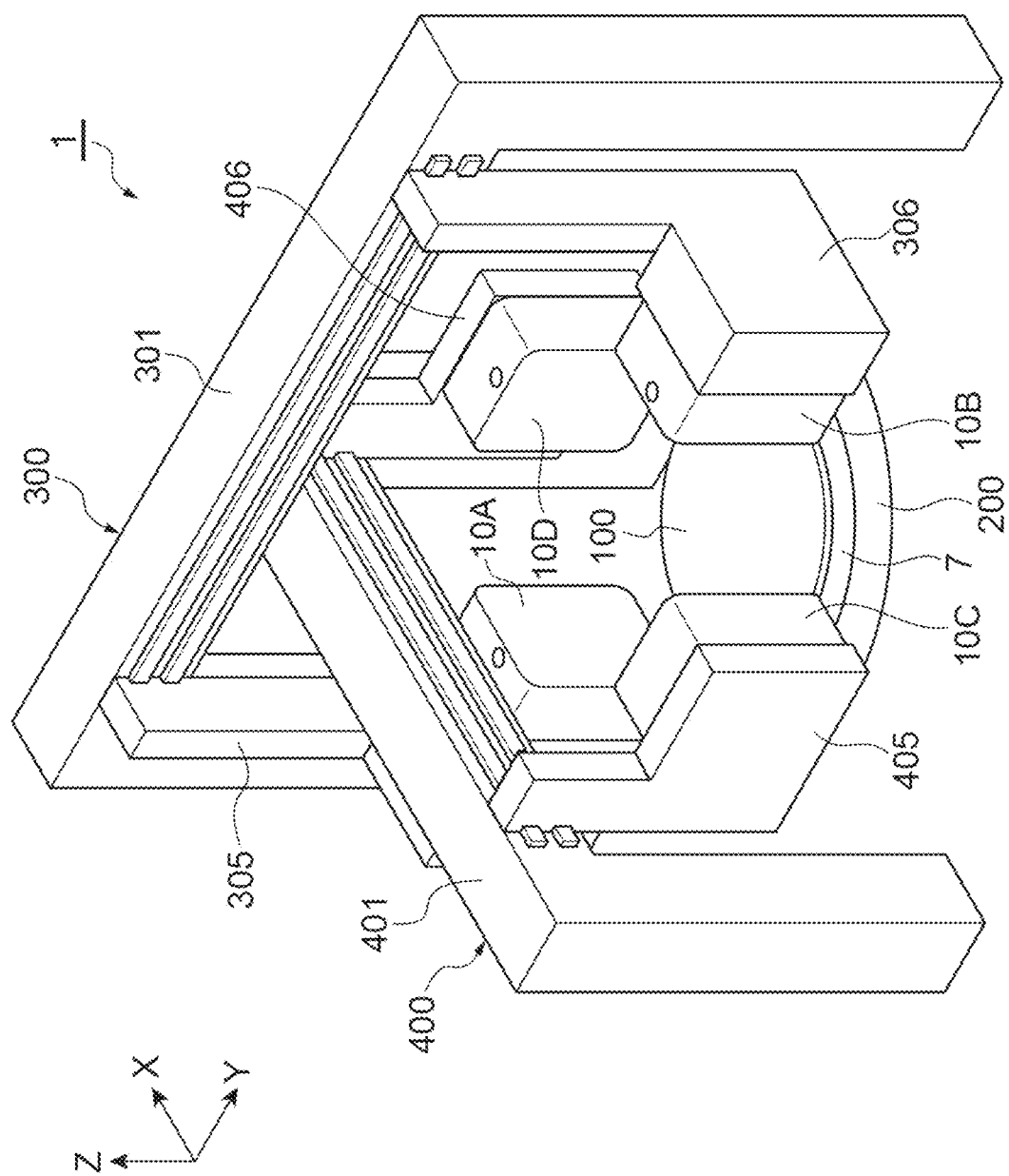
FIG. 8 is a perspective view of the laser processing apparatus of the modification example.

The laser processing apparatus 1 may include three or more laser processing heads. FIG. 8 is a perspective view of a laser processing apparatus 1 including two pairs of laser processing heads. The laser processing apparatus 1 illustrated in FIG. 8 includes a plurality of movement mechanisms 200, 300, and 400, the support portion 7, the pair of laser processing heads 10A and 10B, a pair of laser processing heads 10C and 10D, and a light source unit (not illustrated).

The movement mechanism 200 moves the support portion 7 along the each of the X direction, the Y direction, and the Z direction, and rotates the support portion 7 about an axis parallel to the Z direction.

The movement mechanism 300 includes a fixed portion 301 and a pair of attachment portions (a first attachment portion and a second attachment portion) 305 and 306. The fixed portion 301 is attached to a device frame (not illustrated). The pair of attachment portions 305 and 306 are each attached to a rail provided on the fixed portion 301, and can move in the Y direction independently from each other.

The movement mechanism 400 includes a fixed portion 401 and a pair of attachment portions (a first attachment portion and a second attachment portion) 405 and 406. The fixed portion 401 is attached to a device frame (not illustrated). The pair of attachment portions 405 and 406 are each attached to a rail provided on the fixed portion 401, and can move in the X direction independently from each other. The rail of the fixed portion 401 is arranged to three-dimensionally intersect with the rail of the fixed portion 301.

The laser processing head 10A is attached to the attachment portion 305 of the movement mechanism 300. The laser processing head 10A irradiates the target 100, supported by the support portion 7, with a laser light, while facing the support portion 7 in the Z direction. The laser light emitted from the laser processing head 10A is guided by the optical fiber 2 from the light source unit (not illustrated). The laser processing head 10B is attached to the attachment portion 306 of the movement mechanism 300. The laser processing head 10B irradiates the target 100, supported by the support portion 7, with a laser light, while facing the support portion 7 in the Z direction. The laser light emitted from the laser processing head 10B is guided by the optical fiber 2 from the light source unit (not illustrated).

The laser processing head 10C is attached to the attachment portion 405 of the movement mechanism 400. The laser processing head 10C irradiates the target 100, supported by the support portion 7, with a laser light, while facing the support portion 7 in the Z direction. The laser light emitted from the laser processing head 10C is guided by the optical fiber 2 from the light source unit (not illustrated). The laser processing head 10D is attached to the attachment portion 406 of the movement mechanism 400. The laser processing head 10D irradiates the target 100, supported by the support portion 7, with a laser light, while facing the support portion 7 in the Z direction. The laser light emitted from the laser processing head 10D is guided by the optical fiber 2 from the light source unit (not illustrated).

The configuration of the pair of laser processing heads 10A and 10B in the laser processing apparatus 1 illustrated in FIG. 8 is the same as the configuration of the pair of laser processing heads 10A and 10B in the laser processing apparatus 1 illustrated in FIG. 1. The configuration of the pair of laser processing heads 10C and 10D in the laser processing apparatus 1 illustrated in FIG. 8 is the same as the configuration of the pair of laser processing heads 10A and 10B as a result of rotating the pair of laser processing heads 10A and 10B, in the laser processing apparatus 1 illustrated in FIG. 1, by 90° about an axis parallel to the Z direction.

For example, the housing (first housing) 11 of the laser processing head 10C is attached to the attachment portion 65 with the fourth wall portion 24 positioned on the laser processing head 10D side with respect to the third wall portion 23, and with the sixth wall portion 26 positioned on the support portion 7 side with respect to the fifth wall portion 25. The condensing portion 14 of the laser processing head 10C is offset toward the fourth wall portion 24 (that is, toward the laser processing head 10D) in the Y direction.

The housing (second housing) 11 of the laser processing head 10D is attached to the attachment portion 66 with the fourth wall portion 24 positioned on the laser processing head 10C side with respect to the third wall portion 23, and with the sixth wall portion 26 positioned on the support portion 7 side with respect to the fifth wall portion 25. The condensing portion 14 of the laser processing head 10D is offset toward the fourth wall portion 24 (that is, toward the laser processing head 10C) in the Y direction.

With the above configuration, in the laser processing apparatus 1 illustrated in FIG. 8, when the pair of laser processing heads 10A and 10B each move along the Y direction, the condensing portion 14 of the laser processing head 10A and the condensing portion 14 of the laser processing head 10B can be brought close to each other. Furthermore, when the pair of laser processing heads 10A and 10B each move along the Y direction, the space occupied by each of the pair of laser processing heads 10A and 10B can be reduced. Furthermore, when the pair of laser processing heads 10C and 10D each move along the X direction, the condensing portion 14 of the laser processing head 10C and the condensing portion 14 of the laser processing head 10D can be brought close to each other. Furthermore, when the pair of laser processing heads 10C and 10D each move along the X direction, the space occupied by each of the pair of laser processing heads 10C and 10D can be reduced.

The laser processing head and the laser processing apparatus of the present disclosure are not limited to those for forming the modified region in the target 100, and thus may be those for implementing other types of laser processing.

Finally, an example of an operation performed by the laser processing apparatus 1 will be described. An example of the operation performed by the laser processing apparatus 1 is as follows. It is assumed that a plurality of lines extending in the X direction and arranged in the Y direction are set to the target 100. In such a state, the controller 9 performs a first scan process of scanning a single line with the laser light L1 in the X direction, and a second scan process of scanning another line with the laser light L2 in the X direction. The first scan process and the second scan process at least partially overlap in time. Particularly, the controller 9 can perform, while performing the first scan process one by one on the lines from the one positioned in one end portion of target 100 in the Y direction toward the line one the inner side in the Y direction, the second scan process one by one on the lines from the one positioned in the other end position of the target 100 in the Y direction toward the one on the inner side in the Y direction. As a result, the throughput can be improved.

An example of the operation performed by the laser processing apparatus 1 is as follows. In the laser processing apparatus 1, the controller 9 performs a first scan process in a first state where the laser processing heads 10A and 10B are arranged on one line, to scan the one line with the laser light L1 in the X direction with the focusing point of the laser light L1 positioned at a first position in the Z direction, and performs a second scan process in the first state to scan the one line with the laser light L2 in the X direction with the focusing point of the laser light L2 positioned at a second position (a position more on the incident surface side than the first position) in the Z direction. The controller 9 performs the first scan process and the second scan process with the focusing point of the laser light L2 positioned to be separated from the focusing point of the laser light L1 toward the direction opposite to the X direction by a predetermined distance. The predetermined distance is, for example, 300 µm. With this configuration, cracks can sufficiently advance from the modified region, while improving the throughput.

An example of the operation performed by the laser processing apparatus 1 is as follows. The controller 9 performs the first scan process of scanning one line with the laser light L1 in the X direction and the second scan process of scanning another line with the laser light L2 in the X direction, with the scan processes at least partially overlapping in time, and performs an image capturing process of capturing an image of a region of the target 100 including a line on which the processing has been completed, using an imaging unit movable together with the laser processing head 10A, while only the second scan process is being performed. In the image capturing process, light (light in a near infrared region for example) transmitting through the target 100 is used. With this configuration, whether the laser processing has been successfully performed can be checked in a non-destructive manner, using a time during which the first scan process is not performed.

An example of the operation performed by the laser processing apparatus 1 is as follows. The laser processing apparatus 1 performs peeling processing of peeling a part of the target 100. For example, in the peeling processing, while the support portion 7 rotates, the laser processing heads 10A and 10B respectively emit the laser lights L1 and L2, and the movement of each of the focusing points of the laser lights L1 and L2 in the horizontal direction is controlled. Thus, the modified region is formed along a virtual plane in the target 100. As a result, a part of the target 100 can be peeled with the modified region over the virtual plane serving as a boundary.

An example of the operation performed by the laser processing apparatus 1 is as follows. The laser processing apparatus 1 performs trimming processing of removing an unnecessary portion of the target 100. For example, in the trimming processing, while the support portion 7 rotates, starting and stopping of the emission of the laser lights L1 and L2 from the laser processing heads 10A and 10B is controlled based on rotation information on the support portion 7, in a state where the focusing point is position at positions along the circumferential edge of the effective region of the target 100. Thus, the modified region is formed along the circumferential edge of the effective region of the target 100. As a result, the unnecessary portion can be removed using a jig or air for example, with the modified region serving as a boundary.

An example of the operation performed by the laser processing apparatus 1 is as follows. For the target 100 having a functional element layer on the front surface side, the functional element layer is irradiated with the laser light L1 along a line from the back surface of the target 100, whereby a weakened region is formed in the functional element layer along the line. The laser light L2 with a pulse width shorter than the pulse width of the laser light L1 is emitted into the target 100 along the line from the back surface of the target 100, to follow the laser light L1. With the laser light L2 thus emitted, the crack reaching the front surface of the target 100 is reliably formed along the line, by utilizing the weakened region.

REFERENCE SIGNS LIST 1 laser processing apparatus
7 support portion
8 light source unit
10A, 10B, 10C, 10D laser processing head (first laser processing head, second laser processing head)
11 housing (first housing, second housing)
12 entrance portion
13 adjustment portion
14 condensing portion
14a entrance pupil surface
15 dichroic mirror
16 measurement portion
17 monitoring portion
18 driving portion
19 circuit portion
21 first wall portion
22 second wall portion 23 third wall portion
24 fourth wall portion
25 fifth wall portion
26 sixth wall portion
29 partitioning wall portion
31 attenuator
32 beam expander
33 mirror
34 reflective spatial light modulator
34a reflecting surface
35 imaging optical system
65, 66, 305, 306, 405, 406 attachment portion (first attachment portion, second attachment portion)

The invention claimed is:

1. A laser processing head comprising:
a housing including a first wall portion and a second wall portion facing each other in a first direction, a third wall portion and a fourth wall portion facing each other in a second direction orthogonal to the first direction, and a fifth wall portion and a sixth wall portion facing each other in a third direction orthogonal to the first direction and the second direction;
an entrance portion through which a laser light enters the housing, the entrance portion provided to the housing;
an adjustment portion configured to adjust the laser light that has entered through the entrance portion, the adjustment portion disposed in the housing;
a condensing portion configured to condense the laser light that has been adjusted by the adjustment portion, and emit the laser light to outside of the housing, the condensing portion attached to the housing; and
a circuit portion disposed on a side of the third wall portion with respect to the adjustment portion in the housing, wherein
a distance between the third wall portion and the fourth wall portion is shorter than a distance between the first wall portion and the second wall portion,
the housing is configured to be attached to an attachment portion of a laser processing apparatus, with at least one of the first wall portion, the second wall portion, the third wall portion, and the fifth wall portion disposed on a side of the attachment portion,
the condensing portion is disposed on the sixth wall portion, and is offset toward the fourth wall portion in the second direction,
a partitioning wall portion is provided in the housing to partition a region in the housing into a region on a side of the third wall portion and a region on a side of the fourth wall portion,
the adjustment portion is disposed on the side of the fourth wall portion with respect to the partitioning wall portion in the housing,
the circuit portion is disposed on the side of the third wall portion with respect to the partitioning wall portion in the housing, and
a light path from the entrance portion to the condensing portion is disposed on the side of the fourth wall portion with respect to the partitioning wall portion in the housing.

2. The laser processing head according to claim 1, wherein the entrance portion is provided to the fifth wall portion, and is offset toward the fourth wall portion in the second direction.

3. The laser processing head according to claim 1, wherein the adjustment portion is attached to the partitioning wall portion.

4. The laser processing head according to claim 1, wherein the circuit portion is separated from the partitioning wall portion.

5. The laser processing head according to claim 1 further comprising:
a measurement portion configured to output a measurement light for measuring a distance between a surface of a target and the condensing portion, and detect the measurement light reflected from the surface of the target via the condensing portion; and
a dichroic mirror configured to reflect the measurement light and transmit the laser light, wherein
the circuit portion processes a signal output from the measurement portion, and
the dichroic mirror is disposed between the adjustment portion and the condensing portion in the housing.

6. The laser processing head according to claim 5, wherein the condensing portion is offset toward a one wall portion that is one of the first wall portion and the second wall portion in the first direction.

7. The laser processing head according to claim 6, wherein the entrance portion is provided to the fifth wall portion, and is offset toward the one wall portion in the first direction.

8. The laser processing head according to claim 7, wherein the measurement portion is disposed on a side opposite to the one wall portion with respect to the adjustment portion in the housing.

9. The laser processing head according to claim 7 further comprising a monitoring portion configured to output a monitoring light for monitoring the surface of the target and detect the monitoring light reflected on the surface of the target via the condensing portion, wherein
the monitoring portion is disposed on the side opposite to the one wall portion with respect to the adjustment portion in the housing.

10. The laser processing head according to claim 5 further comprising a driving portion configured to move the condensing portion along the third direction, wherein
the circuit portion controls the driving portion based on the signal output from the measurement portion.

11. A laser processing head comprising:
a housing including a first wall portion and a second wall portion facing each other in a first direction, a third wall portion and a fourth wall portion facing each other in a second direction orthogonal to the first direction, and a fifth wall portion and a sixth wall portion facing each other in a third direction orthogonal to the first direction and the second direction;
an entrance portion through which a laser light enters the housing, the entrance portion provided to the housing;
an adjustment portion configured to adjust the laser light that has entered through the entrance portion, the adjustment portion disposed in the housing; and
a condensing portion configured to condense the laser light that has been adjusted by the adjustment portion, and emit the laser light to outside of the housing, the condensing portion attached to the housing, wherein
a distance between the third wall portion and the fourth wall portion is shorter than a distance between the first wall portion and the second wall portion,
the housing is configured to be attached to an attachment portion of a laser processing apparatus, with at least one of the first wall portion, the second wall portion, the third wall portion, and the fifth wall portion disposed on a side of the attachment portion, the condensing portion is disposed on the sixth wall portion, and is offset toward the fourth wall portion in the second direction, the adjustment portion includes:

a mirror configured to reflect the laser light that has entered through the entrance portion;

a reflective spatial light modulator configured to modulate the laser light reflected by the mirror; and an imaging optical system serving as a bilateral telecentric optical system in which a reflecting surface of the reflective spatial light modulator and an entrance pupil surface of the condensing portion are in an image relationship, the entrance portion and the mirror are disposed on a first straight line extending along the third direction, the reflective spatial light modulator, the imaging optical system, and the condensing portion are disposed on a second straight line extending along the third direction, and the first straight line and the second straight line are parallel to each other, and the first straight line and the second straight line are offset toward the fourth wall portion in the second direction.

12. The laser processing head according to claim 11, wherein the condensing portion is offset toward a one wall portion that is one of the first wall portion and the second wall portion in the first direction, the entrance portion is offset toward the one wall portion in the first direction, and the first straight line is positioned on a side of the one wall portion with respect to the second straight line.

13. The laser processing head according to claim 11, wherein the adjustment portion further includes a beam expander configured to expand a diameter of the laser light, and the beam expander is disposed between the entrance portion and the mirror on the first straight line.

14. The laser processing head according to claim 11, wherein the entrance portion, the adjustment portion, and the condensing portion are disposed on a straight line extending along the third direction.

15. The laser processing head according to claim 14, wherein the adjustment portion includes an attenuator configured to adjust an output of the laser light and a beam expander configured to expand a diameter of the laser light.

16. A laser processing apparatus comprising:

a first laser processing head and a second laser processing head that are each the laser processing head according to claim 11;

a first attachment portion that is the attachment portion to which the housing of the first laser processing head is attached;

a second attachment portion that is the attachment portion to which the housing of the second laser processing head is attached;

a light source unit configured to output the laser light entering through each of the entrance portion of the first laser processing head and the entrance portion of the second laser processing head; and a support portion configured to support a target, wherein the first attachment portion and the second attachment portion each move along the second direction, a first housing that is the housing of the first laser processing head is attached to the first attachment portion with the fourth wall portion of the first housing positioned on side of the second laser processing head with respect to the third wall portion of the first housing, and with the sixth wall portion of the first housing positioned on side of the support portion with respect to the fifth wall portion of the first housing, and a second housing that is the housing of the second laser processing head is attached to the second attachment portion with the fourth wall portion of the second housing positioned on side of the first laser processing head with respect to the third wall portion of the second housing, and with the sixth wall portion of the second housing positioned on the side of the support portion with respect to the fifth wall portion of the second housing.

17. The laser processing apparatus according to claim 16, wherein the first attachment portion and the second attachment portion each move along the third direction.

18. The laser processing apparatus according to claim 16, wherein the support portion moves along the first direction and rotates about an axis parallel to the third direction.

19. A laser processing apparatus comprising:

the laser processing head according to claim 11;

the attachment portion to which the housing of the laser processing head is attached;

a light source unit configured to output the laser light that enters through the entrance portion of the laser processing head; and a support portion configured to support a target, wherein the attachment portion moves along the second direction.

20. The laser processing apparatus according to claim 19, wherein the attachment portion moves along the third direction.

21. The laser processing apparatus according to claim 19, wherein the support portion moves along the first direction and rotates about an axis parallel to the third direction.

* * * * *